United States Patent
Boden et al.

(10) Patent No.: US 8,995,263 B2
(45) Date of Patent: Mar. 31, 2015

(54) METHOD AND APPARATUS FOR INTERNAL/EXTERNAL MEMORY PACKET AND BYTE COUNTING

(71) Applicant: Marvell World Trade Ltd., St. Michael (BB)

(72) Inventors: Kurt Thomas Boden, Strangnas (SE); Par Westlund, Stockholm (SE)

(73) Assignee: Marvell World Trade Ltd., St. Michael (BB)

( * ) Notice: Subject to any disclaimer, the term of this patent is extended or adjusted under 35 U.S.C. 154(b) by 141 days.

(21) Appl. No.: 13/898,942

(22) Filed: May 21, 2013

(65) Prior Publication Data

US 2013/0315259 A1 Nov. 28, 2013

Related U.S. Application Data

(60) Provisional application No. 61/650,157, filed on May 22, 2012, provisional application No. 61/710,868, filed on Oct. 8, 2012.

(51) Int. Cl.
*H04J 1/16* (2006.01)
*H04L 12/28* (2006.01)
*H04L 12/861* (2013.01)

(52) U.S. Cl.
CPC .................................. *H04L 49/9084* (2013.01)
USPC ............................ 370/230; 370/252; 370/412

(58) Field of Classification Search
USPC .................................. 370/230, 235, 252, 412
See application file for complete search history.

(56) References Cited

U.S. PATENT DOCUMENTS

| | | | |
|---|---|---|---|
| 2001/0033575 A1* | 10/2001 | Shimamura et al. | 370/419 |
| 2004/0083077 A1* | 4/2004 | Baumer et al. | 702/185 |
| 2004/0205228 A1* | 10/2004 | Rose et al. | 709/236 |
| 2006/0265526 A1* | 11/2006 | Holbrook | 710/52 |
| 2008/0181109 A1* | 7/2008 | Igarashi et al. | 370/231 |
| 2011/0149736 A1* | 6/2011 | Kashyap et al. | 370/235 |

OTHER PUBLICATIONS

Zhao, et al., "Design of a Novel Statistics Counter Architecture with Optimal Space and Time Efficiency," IBM T.J Watson Research Center, Technical Report 12 pgs., Jan. 2006.

* cited by examiner

*Primary Examiner* — Andrew Lee

(57) ABSTRACT

Systems and methods are provided for counting a number of received packets and a number of bytes contained in the received packets. A system includes a first memory disposed in an integrated circuit, the first memory being configured as a first combination counter having a first set of bits for storing a subtotal of received packets, and a second set of bits for storing a subtotal of bytes contained in the received packets. A second memory is external to the integrated circuit. The second memory is configured to store a total number of received packets and a total number of bytes contained in the received packets. Update circuitry is configured to update the total number of packets stored in the second whenever either of the first set of bits or the second set of bits overflows in the first memory.

20 Claims, 5 Drawing Sheets

```
ComboCountSRAM(i, length)
202    T = A[i].byte + length                              // T has more bits than A[i].byte
204    if (A[i].pkt == 2^p) OR (T >= 2^b)                  // if Wrap
206        EnqueuetDRAM(i, A[i].pkt, T)                    // update DRAM with pkt and byte(T)
208        A[i].pkt = 0
210        A[i].byte = 0                                   // Clear both pkt and byte
       else
212        A[i].pkt = A[i].pkt + 1                         // update
214        A[i].byte = T
```

Fig. 2

METHOD AND APPARATUS FOR INTERNAL/EXTERNAL MEMORY PACKET AND BYTE COUNTING

CROSS-REFERENCE TO RELATED APPLICATIONS

This application claims priority to U.S. Provisional Patent Application No. 61/650,157 filed May 22, 2012, entitled "DRAM Packet and Byte Counter," and U.S. Provisional Patent Application No. 61/710,868, filed Oct. 8, 2012, entitled "DRAM Packet and Byte Counter," which are herein incorporated in their entirety.

FIELD

The technology described herein relates generally to packet and packet byte counting and more particularly to packet and packet byte counting using an internal and an external memory.

BACKGROUND

A network device, such as a switch, is tasked with counting a number of packets received by that network device as well as a number of bytes contained in those received packets. Certain hardware utilized in such counting have technical limitations, such as processing or access speed limitations that constrain counting capabilities.

The description above is presented as a general overview of related art in this field and should not be construed as an admission that any of the information it contains constitutes prior art against the present patent application.

SUMMARY

Examples of systems and methods are provided for counting a number of received packets and a number of bytes contained in the received packets. A system includes a first memory disposed in an integrated circuit, the first memory being configured as a first combination counter having a first set of bits for storing a subtotal of received packets, and a second set of bits for storing a subtotal of bytes contained in the received packets. A second memory is external to the integrated circuit. The second memory is configured to store a total number of received packets and a total number of bytes contained in the received packets. Update circuitry is configured to update the total number of packets stored in the second memory using the first set of bits from the first memory and to update the total number of bytes stored in the second memory using the second set of bits from the first memory whenever either of the first set of bits or the second set of bits overflows in the first memory.

As another example, a method of tracking a number of received packets and a number of bytes contained in the received packets includes updating a first combination counter stored in a first memory disposed in an integrated circuit based on a received packet and a number of bytes in the received packet, where a first set of bits of the first combination counter is configured to count a subtotal of received packets, and where a second set of bits of the first combination counter is configured to count a subtotal of bytes contained in the received packets. A determination is made as to whether the first set of bits or the second set of bits have overflowed, A total number of received packets and a total number of bytes in the received packets stored in a second memory that is external to the integrated circuit are updated when either of the first set of bits or the second set of bits of the first combination counter have overflowed.

BRIEF DESCRIPTION OF THE DRAWINGS

FIG. 2 depicts example pseudo code employed by the update circuitry in one embodiment of the disclosure.

DETAILED DESCRIPTION

Figure 1:
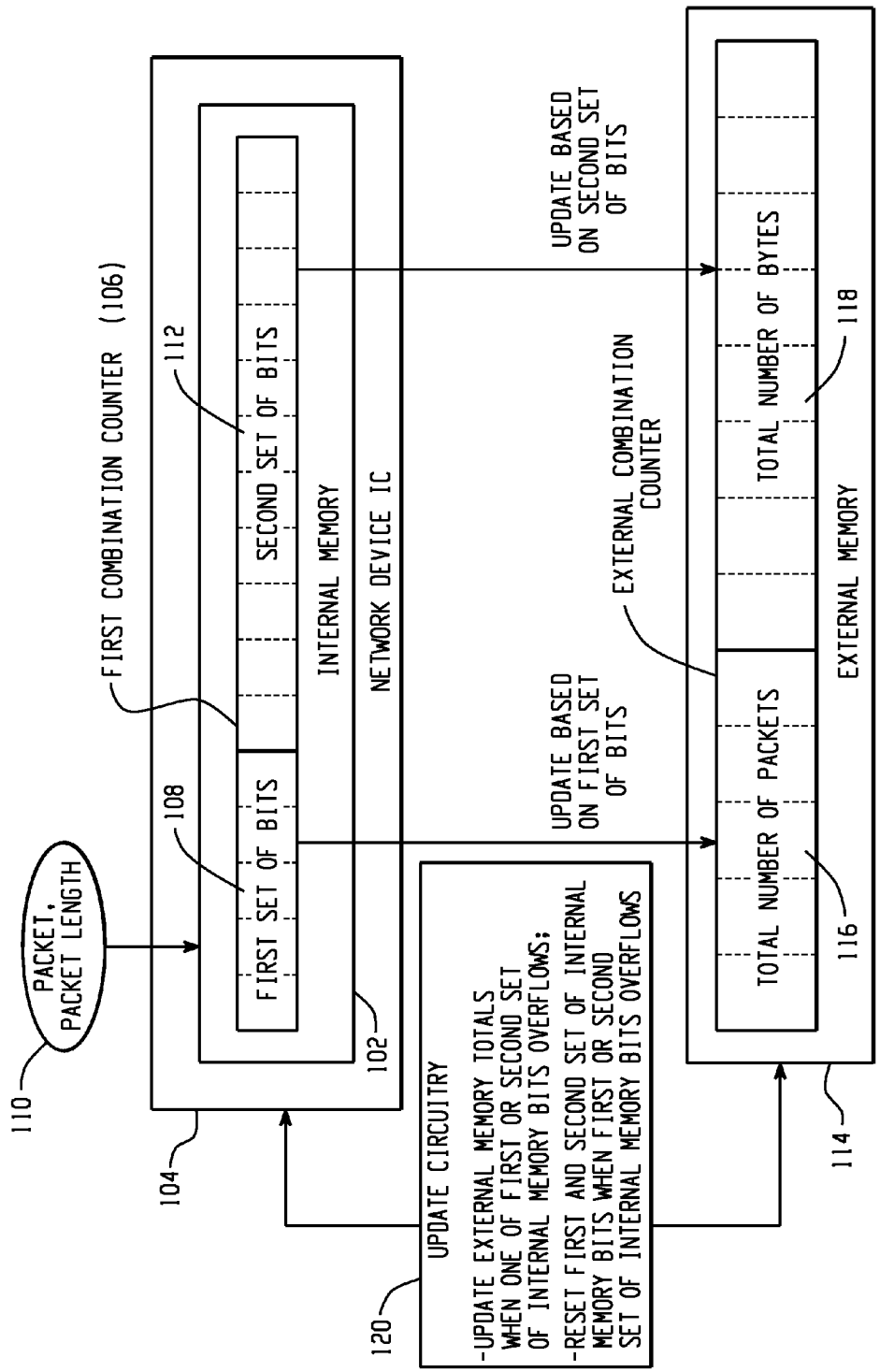
FIG. 1 is a block diagram depicting a system for counting a number of received packets and a number of bytes contained in the received packets.

FIG. 1 is a diagram depicting a system for counting a number of received packets and a number of bytes contained in the received packets. Network devices, such as switches, are tasked with providing counters that count both the number of incoming packets as well as a number of bytes received in those packets. Oftentimes a network device includes numerous such counters (e.g., hundreds or thousands of counters). In some implementations, packets are received at a high rate that continues to increase, requiring fast counting operations, such as read-write-modify memory operations.

An internal memory, such as a static random access memory, disposed on a same integrated circuit as a network processor or other data processor of the network device can provide sufficiently fast memory operations to keep up with the fast rate of packet receipt. However, such internal memory space typically is comparatively expensive and unpractical for maintaining such packet and packet size counts for large numbers of counters over long periods of time. Thus, the number of bits available for allocation to each internal counter is limited. An external memory, such as an external dynamic random access memory, provides larger, less expensive storage, in an embodiment. While such off die memories offer sufficient memory space for packet counting, those memories, in some embodiments, are not be fast enough to handle high packet rates.

FIG. 1 is a block diagram depicting a system for counting a number of received packets and a number of bytes contained in the received packets that utilizes both a first internal memory disposed in an integrated circuit and a second external memory that is external to the integrated circuit. For simplicity, a typical network device includes numerous components that are not seen. The system of FIG. 1 includes a first internal memory 102 disposed in a network device integrated circuit 104 (e.g., on a first circuit substrate). The internal memory 102 is configured as a first combination counter 106 that maintains a number of bits at an address for storing a first value and a number of bits at that address for storing a second value. The combination counter 106 has a first set of bits 108 for storing a subtotal of received packets 110 and a second set of bits 112 for storing a subtotal of bytes contained in the received packets 110. The system of FIG. 1 further includes a second external memory 114 that is external to the network device integrated circuit 104 (e.g., on a second circuit substrate). The second memory 114 is configured to store a total number 116 of received packets and a total number of bytes 118 contained in the received packets. In one example, the second memory 114 comprises an external combination counter having a first set of bits 116 for storing the total number of packets and a second set of bits 118 for storing the total number of bytes. The system of FIG. 1 also includes update circuitry 120 configured to update the total number of packets 116 stored in the second memory 114 using the first set of bits 108 from the first memory 102 and to update the total number of bytes 118 stored in the second memory 114 using the second set of bits 112 from the first memory 102 whenever either of the first set of bits 108 or the second set of bits 112 overflows in the first memory 104.

The system of FIG. 1 utilizes certain advantages of the internal memory 102 and the external memory 114 to maintain an accurate count of the number of packets 110 received and the number of bytes of data therein despite a potential for a high rate of receipt of data packets 110. The system utilizes the fast operational capabilities of the internal memory 102 to track the number of packets received in the first set of bits 108 and the number of bytes in those packets in the second set of bits 112. Due to the expense of storage in the internal memory 102, only a limited number of bits are allocated to the first combination counter 106, with the expectation that the first combination counter 106 will not necessarily have a sufficient number of bits available at 108, 112 to hold an accurate count of packets received 110 and/or bytes contained in the received packets 110. However, the first combination counter 106 is used to hold a subtotal of packets received 110 and bytes contained in those received packets 110, where an actual total number of packets 116 and total number of bytes 118 is stored in the second memory 114 that is external to the integrated circuit 104. Whenever one of the first set of bits 108, for example corresponding to a number of packets received, or the second set of bits 112, for example corresponding to a number of bytes received, overflows, the update circuitry 120 is configured to update the total number of packets 116 stored in the second memory 114 based on the subtotal of packets in the first set of bits 108 and to further update the total number of bytes 118 stored in the second memory 114 based on the subtotal of bytes in the second set of bits 112. The memory space allocated at 116 for storing the total number of packets (e.g., 55 bits) is greater or significantly greater than the number of bits allocated to the first set of bits 108 (e.g., 5 bits) for counting the subtotal of packets. Similarly, the memory space allocated at 118 for storing the total number of bytes (e.g., 64 bits) is greater or significantly greater than the number of bits allocated to the second set of bits 112 (e.g., 11 bits) for counting the subtotal of bytes. The update circuitry 120 is configured, in an embodiment, to perform other operations as well, such as resetting the first set of bits 108 and the second set of bits 112 when either of the first set of bits 108 or the second set of bits 112 overflows and the total number of packets 116 and the total number of bytes 118 have been updated.

The first combination counter 106 is configured to include a first set of bits 108 for counting a number of received packets 110 and a second set of bits 112 for counting a number of bytes contained in the received packets 110. In one embodiment of the disclosure, the number of bits assigned to the first set of bits 108 differs from the number of bits assigned to the second set of bits 110, such that the first set of bits 108 and the second set of bits 110 are capable of storing differing maximum values. In the example of FIG. 1, the first set of bits 108 available for counting the subtotal of received packets contains fewer bits than the second set of bits 112 for counting the subtotal of bytes.

Generally, it is expected that the number of bytes counted by the second set of bits 112 will be greater than the number of packets counted by the first set of bits 108, as this will be the case any time that received packets 110 contain more than one byte. The system of FIG. 1, in embodiment, is optimized in an attempt to best utilize the limited number of bits available to the first combination counter 106 in the internal memory 102 by utilizing as much of the range of counting for the first set of bits 108 and the second set of bits 112 as possible. In one embodiment of the disclosure, the relative sizes of the first set of bits 108 and the second set of bits 112 are selected so that the first set of bits 108 and the second set of bits 112 are expected to overflow (e.g., reach or surpass their maximum counting ability) at approximately the same rate, such as based on a statistically determined average packet size, an expected minimum packet size or other metric. With neither of the first set of bits 108 or the second set of bits 112 being expected to overflow sooner than the other, on average, the time period between updates to the total number of packets 116 and the total number of bytes 118 in the second external memory 114 is maximized, which is often desirable when the second external memory 114 is a slower operation memory, such as a dynamic random access memory. In one embodiment of the disclosure, the first set of bits 108 is configured to contain five bits allowing for counting up to 32 packets, and the second set of bits 112 is configured to contain eleven bits allowing for counting up to 2048 bytes, where the first combination counter 106 contains 16 total bits for counting. It is noted that by selecting a total number of bits for an internal counter that is significantly fewer bits than is needed for many counting operations, and by periodically updating an external counter, a much greater number of counters can be disposed on a network device IC.

Because the actual size of received packets 110 is not known beforehand, in practice, the first set of bits 108 and the second set of bits 112 will not always overflow at precisely the same time (e.g., the first and second sets of bits will not both overflow for a particular packet). The update circuitry is configured to update both the total number of packets 116 and the total number of bytes 118 when either of the first set of bits 108 or the second set of bits 112 overflows. The update circuitry 120 is further configured to reset both the first set of bits 108 and the second set of bits 112 after one of those sets of bits 108, 112 overflows and the totals 116, 1118, for packets and bytes respectively, are updated.

In one embodiment of the disclosure, the update circuitry 120 is configured to handle certain special cases. For example, in the illustration described above, a first combination counter 106 is configured to have five bits in the first set of bits 108 and eleven bits in the second set of bits 112, where the eleven bits allow for counting up to 2048 bytes of data stored within received packets 110. In some embodiments, there are packets received which exceed 2048 bytes in length, such that adding more than 2048 to the second set of bits would cause a double overflow of the second set of bits 112, such that the total number of bytes 118 could not be accurately updated using the second set of bits 112 alone. To address this and other special case situations, additional logic is included in the update circuitry 120 to maintain accurate packet counts and packet byte counts, in an embodiment.

FIG. 2 depicts example pseudo code employed by the update circuitry in one embodiment of the disclosure. In the example of FIG. 2, the first set of bits for counting packets at combination counter i in the internal memory is represented by A[i].pkt, and the second set of bits for counting bytes in those packets at combination counter i is denoted by A[i].byte. At 202, a temporary variable T is assigned the sum of A[i].byte, the current byte count of the second set of bits of combination counter i, and the length variable representing the length in bytes of the current received packet. The temporary variable of the update circuitry is capable of holding a larger number of bits than A[i].byte for the particular combination counter i. The temporary variable T is used to maintain an accurate byte count even when the length variable is so large that it would result in a double overflow of A[i].byte, causing an indeterminate byte count for combination counter i.

At 204, a determination is made as to whether the current packet will cause either of the first set of bits A[i].pkt or the second set of bits A[i].byte to overflow. The statement at 204 is true when either the first set of bits A[i].pkt is at its maximum value $2^p$, where p is the number of bits in the first set of bits (i.e., the current received packet will increment that packet count by one and beyond the maximum value $2^p$) or the temporary variable T is at the maximum value for the second set of bits A[i].byte of $2^b$, where b is the number of bits in the second set of bits.

When the statement at 204 is true, a command is made at 206 to update the total number of packets and the total number of bytes at the external memory based on the packet counting first set of bits A[i].pkt and the temporary value T containing the current byte count subtotal. The overflow processing continues at 208, where the packet count at the first set of bits A[i].pkt is reset, and at 210, where the byte count at the second set of bits A[i].byte is reset. When the statement at 204 is false, no overflow condition is detected. Accordingly, the first set of bits A[i].pkt for counting packets is incremented at 212, and the second set of bits A[i].byte for counting bytes in those packets is updated with the value of the temporary variable T.

As noted at 206, when either of the first set of bits or the second set of bits will overflow based upon the current packet, a command is made to update the total number of packets and the total number of bytes at the external memory. In one embodiment of the disclosure, that update operation is performed using a data queue operation.

Figure 3:
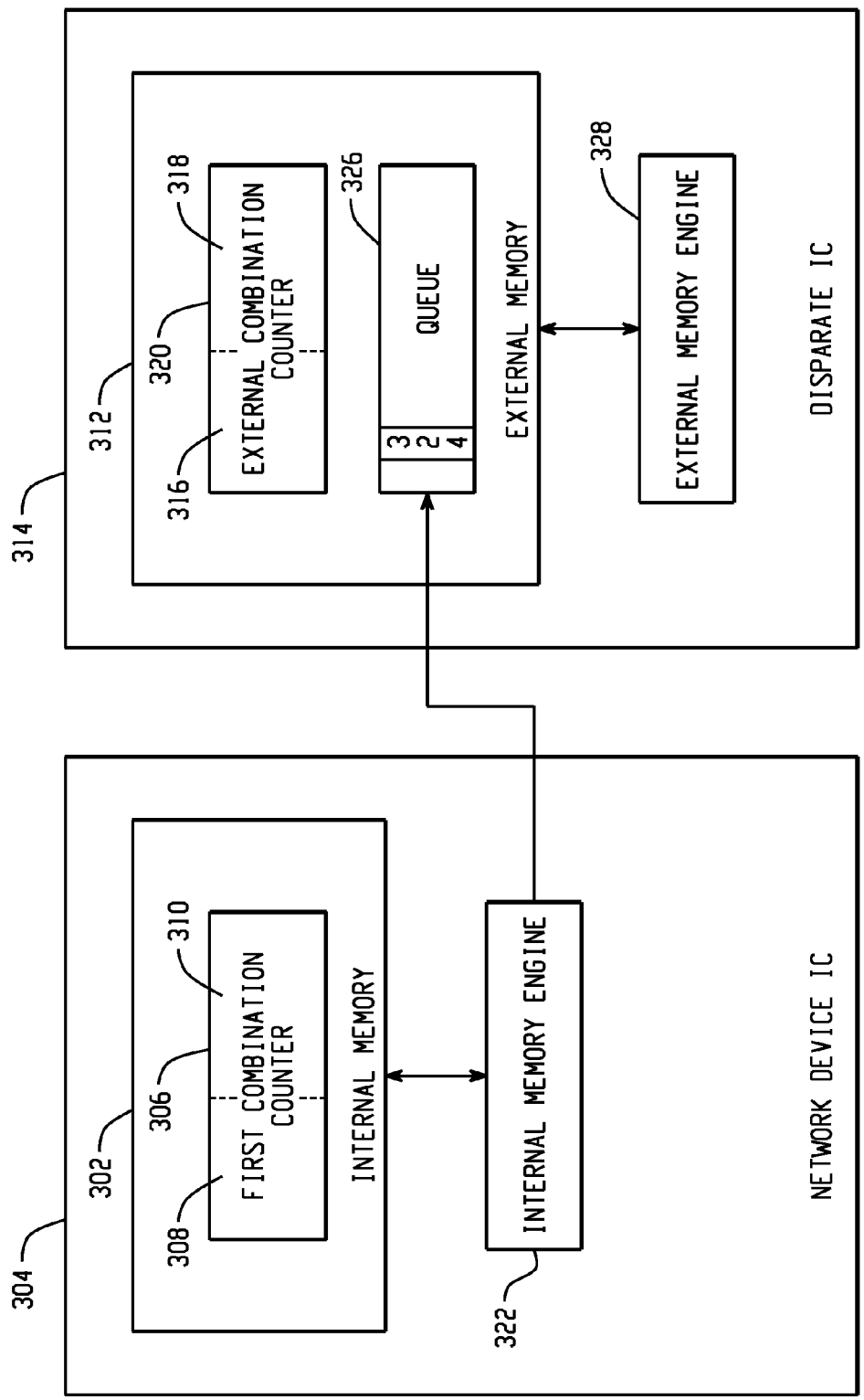
FIG. 3 is a block diagram depicting interaction between an internal memory engine, a queue at an external memory, and an external memory engine to facilitate an update operation.

FIG. 3 is a block diagram depicting interaction between an internal memory engine, a queue at an external memory, and an external memory engine to facilitate an update operation. The system of FIG. 3 includes an internal memory 302 that is disposed on an integrated circuit 304 of a network device. The internal memory 302 is configured as a first combination counter 306 having a first set of bits 308 for storing a subtotal of received packets and a second set of bits 310 for storing a subtotal of bytes contained in the received packets. The system of FIG. 3 further includes a second, external memory 312 that is external to the integrated circuit 304, such as being disposed on a disparate integrated circuit 314. The external memory 312 includes a mechanism for storing a total number of received packets 316 and a mechanism for storing a total number of bytes 318 in those received packets in the form of an external combination counter 320.

The network device integrated circuit 304 further includes an internal memory engine 322 configured to perform certain update operations based on received packets. In one embodiment of the disclosure, the internal memory engine 322 is configured to send a command to update the total number of packets 316 stored in the external memory 312 and to update the total number of bytes 318 stored in the second memory 312 whenever either of the first set of bits 308 or the second set of bits 310 in the first combination counter 306 in the internal memory 302 overflows. In the example of FIG. 3, the internal memory engine 322 commands the updating of the external combination counter 320 by adding an entry 324 to a buffer queue 326 at the external memory 312. The entry 324 includes the subtotals of received packets and received bytes based on the first set of bits 308 and the second set of bits 310 of the first combination counter 306. The internal memory engine 322 is also configured to perform other operations such as resetting the first set of bits 308 and the second set of bits 310 after sending the buffer entry command after overflow of the first set of bits 308 or the second set of bits 318, in an embodiment.

An external memory engine 328 interacts with the queue 326 and the external combination counter 320 to update the total number of packets 316 and the total number of bytes 318 based on the queue entry 324. In one embodiment of the disclosure, each first combination counter 306 at the internal memory 302 is matched with an external combination counter 320 in a one-to-one relationship. In other embodiments, many first combination counters 306 are associated with a single external combination counter 320 in a many-to-one relationship. In the example of FIG. 3, the first combination counter 306 and the external combination counter 320 are associated via a one-to-one relationship. The internal memory engine 322 adds an entry 324 to the queue buffer 326 such as via a command:

EnqueuetDRAM(i,A[i].pkt,T), where i identifies the first combination counter 306 and the corresponding external combination counter to be updated, A[i].pkt identifies the number of packets that should be added to the packet count 316, and T identifies the number of bytes that should be added to the byte count 318.

Figure 4:
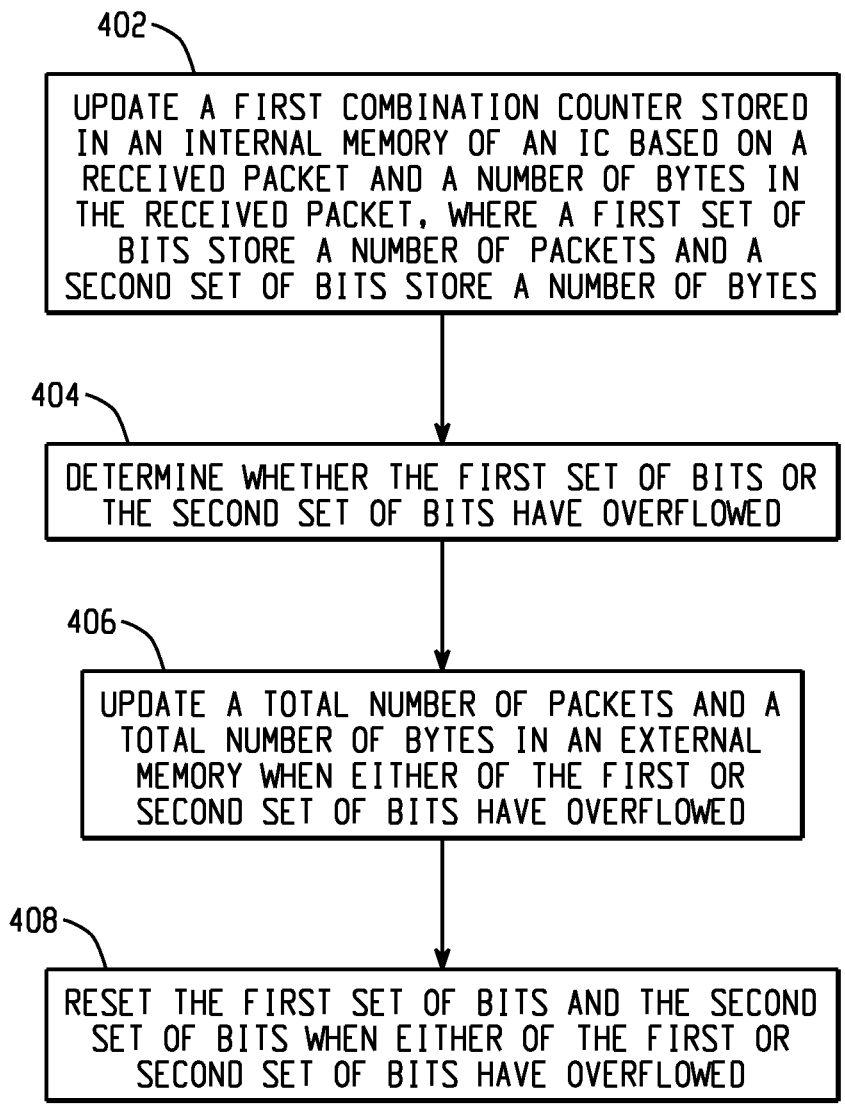
FIG. 4 is a flow diagram depicting a method of tracking a number of received packets and a number of bytes contained in the received packets.

FIG. 4 is a flow diagram depicting a method of tracking a number of received packets and a number of bytes contained in the received packets. At 402, a first combination counter stored in a first memory disposed in an integrated circuit is updated based on a received packet and a number of bytes in the received packet, where a first set of bits of the first combination counter is configured to count a subtotal of received packets, and where a second set of bits of the first combination counter is configured to count a subtotal of bytes contained in the received packets. A determination is made at 404 as to whether the first set of bits or the second set of bits have overflowed. At 406, a total number of received packets and a total number of bytes in the received packets stored in a second memory that is external to the integrated circuit are updated when either of the first set of bits or the second set of bits of the first combination counter have overflowed. At 408, the first set of bits and the second set of bits are reset when either of the first set of bits or the second set of bits of the first combination counter have overflowed.

Figure 5:
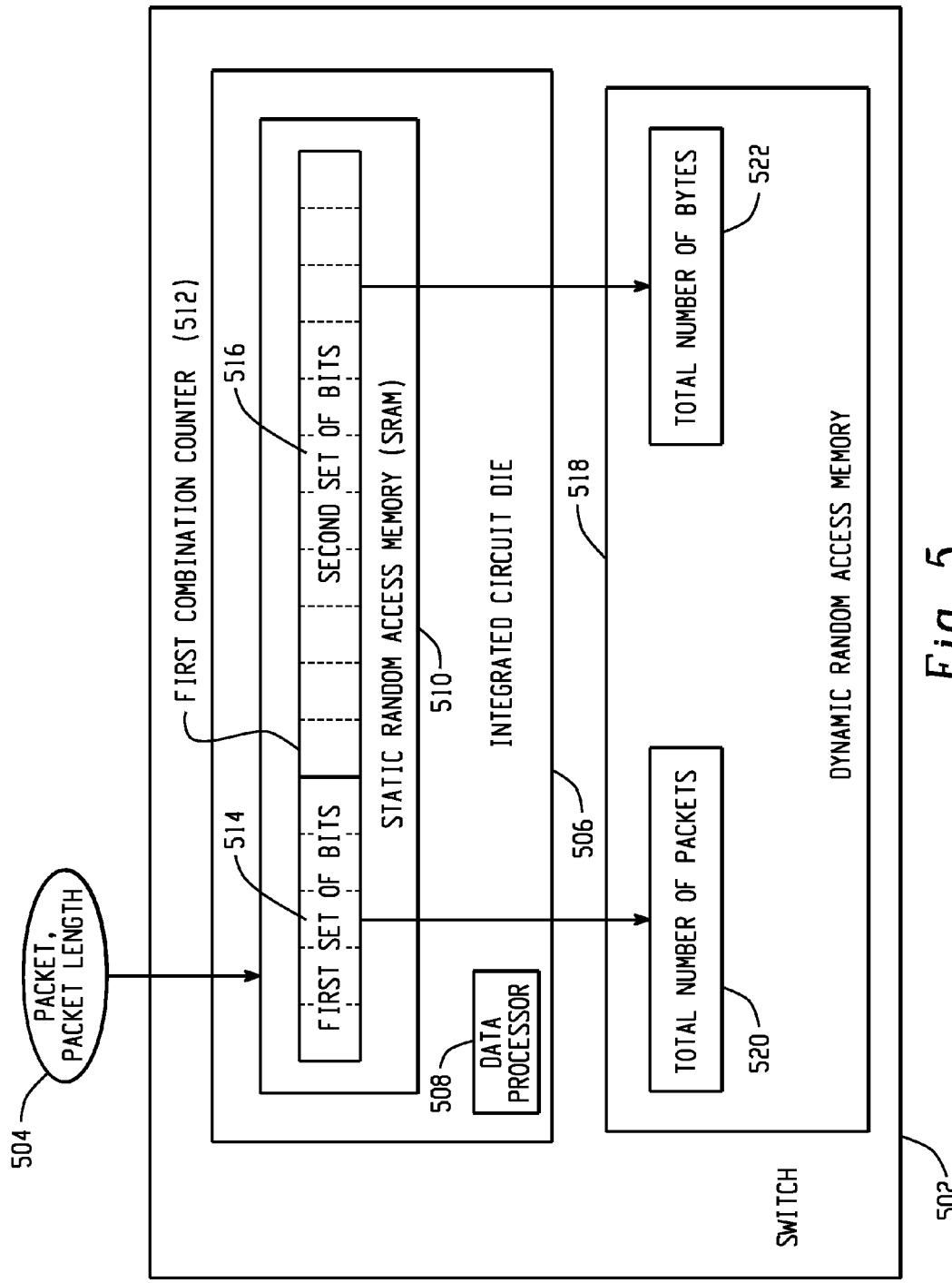
FIG. 5 is a block diagram depicting an example implementation of a system and method for counting a number of received packets and a number of bytes contained in the received packets in the form of a switch.

FIG. 5 is a block diagram depicting an example implementation of a system and method for counting a number of received packets and a number of bytes contained in the received packets in the form of a switch. A switch 502 receives a stream of packets 504 having packet lengths of a number of bytes. An integrated circuit die 506 includes a data processor 508 disposed thereon for processing the received packets 504. Among other functions, the data processor 508 is tasked with maintaining a count of a number of packets received (e.g., on a given port) and a number of bytes stored in those received packets. The data processor 508 performs such operations using an internal static random access memory 510 that is configured as a first combination counter 512 having a first set of bits 514 for storing a subtotal of received packets and a second set of bits 516 for storing a subtotal of bytes contained in the received packets. The switch 502 further includes a second memory that is external to the integrated circuit die 506 in the form of a dynamic random access memory 518. The dynamic random access memory 518 is configured to store a total number of received packets 520 and a total number of bytes 522 contained in the received packets. The data processor 508 is configured to update the total number of packets 520 stored in the dynamic random access memory 518 using the first set of bits 5114 from the static random access memory 510 and to update the total number of bytes 522 stored in the dynamic random access memory 518 using the second set of bits 516 from the static random access memory 510. The data processor 518 is configured, in an embodiment, to perform other operations as well such as resetting the first set of bits 514 and the second set of bits 516 when either of the first set of bits 514 or the second set of bits 516 overflows.

Certain optimizations are performed in implementing a system or method for counting a number of received packets and a number of bytes contained in the received packets. In one embodiment of the disclosure, the number of bits allocated to the first set of bits and the second set of bits are selected so that the external memory's counting rate capability is greater than the average wrap rate of the first set of bits or the second set of bits. In one example, the first set of bits for counting received packets is set at five bits while the second set of bits for counting bytes in those received packets is set at eleven bits in a two byte combination counter.

In another embodiment of the disclosure, to improve the statistical performance of the internal and external counters, especially in cases where multiple internal and external counters are utilized, each internal counter is initialized with random or other values [R, S] and the associated external counters are initialized with corresponding negative values [−R, −S]. Such an optimization avoids many internal counters overflowing in a short period of time, such as on system startup. As an example, a first set of bits in an internal first combination counter is set at a value R (e.g., a random number, a value based on the address of the first combination counter in the internal memory), and the total number of packets in the external memory is set at an initial value of −R. Additionally, the second set of bits in the internal first combination counter is set at a value S, and the total number of bytes in the external memory is set at air initial value of −S.

This application uses examples to illustrate the invention. The patentable scope of the invention includes other examples.

What is claimed is:

1. A system for counting a number of received packets and a number of bytes contained in the received packets, comprising:
   a first memory disposed in an integrated circuit, the first memory being configured as a first combination counter having a first set of bits for storing a subtotal of received packets, and a second set of bits for storing a subtotal of bytes contained in the received packets;
   a second memory that is external to the integrated circuit, the second memory being configured to store a total number of received packets and a total number of bytes contained in the received packets; and
   update circuitry configured to update the total number of packets stored in the second memory using the first set of bits from the first memory and to update the total number of bytes stored in the second memory using the second set of bits from the first memory, whenever either of the first set of bits or the second set of bits overflows in the first memory.

2. The system of claim 1, wherein the system is further configured to reset the first set of bits and the second set of bits when either of the first set of bits or the second set of bits overflows.

3. The system of claim 1, wherein the second memory comprises an external combination counter having a first set of bits configured to store the total number of packets and a second set of bits configured to store the total number of bytes.

4. The system of claim 3, wherein the first set of bits of the external combination counter contains more bits than the first set of bits of the first combination counter; and
   wherein the second set of bits of the external combination counter contains more bits than the second set of bits of the first combination counter.

5. The system of claim 1, wherein the first set of bits available for counting the subtotal of received packets contains fewer bits than the second set of bits available for counting the subtotal of bytes.

6. The system of claim 1, wherein the number of bits in the first set of bits and the number of bits in the second number of bits are set based on an expected average packet size or expected minimum packet size.

7. The system of claim 1, wherein the first memory disposed in the integrated circuit contains multiple combination counters configured to count numbers of received packets and to count numbers of bytes at a network device.

8. The system of claim 1, wherein the second memory performs read-write-modify operations at a rate that is insufficiently fast to track subtotals of received packets and subtotals of bytes.

9. The system of claim 1, wherein the first memory is a static random access memory, and wherein the second memory is a dynamic random access memory.

10. The system of claim 9, wherein the static random access memory and the dynamic random access memory are components of a switch.

11. The system of claim 1, further comprising a buffer at the second memory, wherein the system is configured to update the total number of received packets and the total number of bytes by:
   adding an entry to the buffer when either of the first set of bits or the second set of bits overflows, wherein the entry includes subtotals of received packets and received bytes based on the first set of bits and the second set of bits of the first memory to be added to the total number of received packets and the total number of bytes at the second memory, and wherein the total number of received packets and the total number of bytes are updated based on the buffer entry.

12. The system of claim 1, wherein the first memory is disposed on a first circuit substrate, and wherein the second memory is disposed on a second circuit substrate that is separate from the first substrate.

13. The system of claim 1, wherein updating the total number of bytes in the second memory comprises adding a number to the total number of bytes in the second memory based on a number of bytes in a current packet and the number of bytes previously stored by the second set of bits in the first memory.

14. A network device, comprising:
   a static random access memory disposed in an integrated circuit, the static random access memory being configured as a first combination counter having a first set of bits for storing a subtotal of received packets, and a second set of bits for storing a subtotal of bytes contained in the received packets;

a dynamic random access memory that is external to the integrated circuit, the dynamic random access memory being configured to store a total number of received packets and a total number of bytes contained in the received packets; and update circuitry configured to update the total number of packets stored in the dynamic random access memory using the first set of bits from the static random access memory and to update the total number of bytes stored in the dynamic random access memory using the second set of bits from the static random access memory, whenever either of the first set of bits or the second set of bits overflows in the static random access memory.

15. A method of tracking a number of received packets and a number of bytes contained in the received packets, comprising:

updating a first combination counter stored in a first memory disposed in an integrated circuit based on a received packet and a number of bytes in the received packet, wherein a first set of bits of the first combination counter is configured to count a subtotal of received packets, and wherein a second set of bits of the first combination counter is configured to count a subtotal of bytes contained in the received packets;

determining whether the first set of bits or the second set of bits have overflowed; and updating a total number of received packets and a total number of bytes in the received packets stored in a second memory that is external to the integrated circuit when either of the first set of bits or the second set of bits of the first combination counter have overflowed.

16. The method of claim 15, further comprising:
resetting the first set of bits and the second set of bits when either of the first set of bits or the second set of bits of the first combination counter have overflowed.

17. The method of claim 15, wherein updating the total number of bytes includes:
determining a byte value based on the second set of bits and a number of bytes in the current packet;
incrementing the total number of bytes stored in the second memory by the byte count.

18. The method of claim 15, wherein the first set of bits for counting the number of received packets contains fewer bits than the second number of bits for counting the number of bytes.

19. The method of claim 15, wherein the total number of received packets and the total number of bytes are stored in a second combination counter.

20. The method of claim 15, wherein the first set of bits of the first combination counter contains five bits, and wherein the second set of bits of the first combination counter contains eleven bits.

* * * * *